Dec. 11, 1945.  A. A. McCORMACK  2,390,892
PIPE COUPLING
Filed July 26, 1943
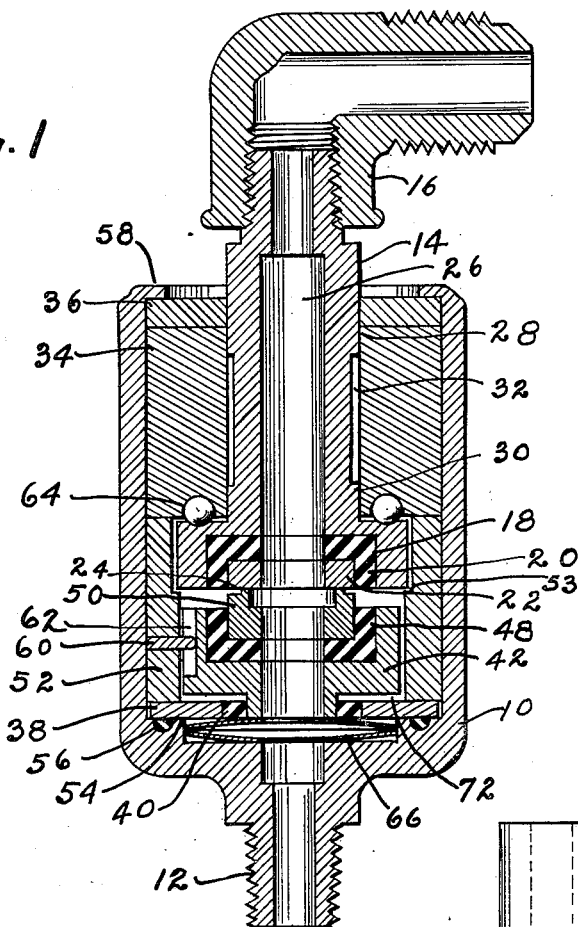
Fig. 1
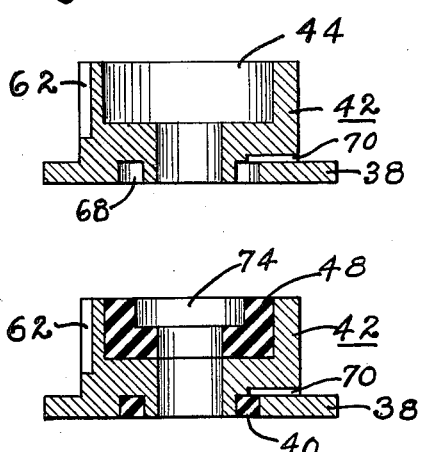
Fig. 2
Fig. 3
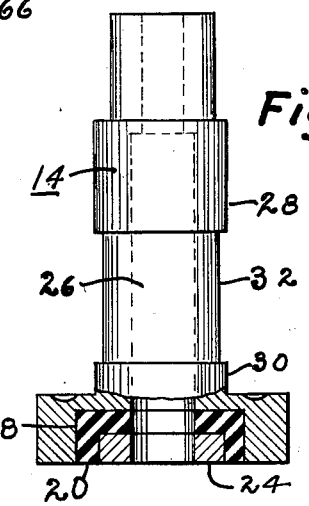
Fig. 4
Alex A. McCormack, INVENTOR.
BY Spencer, Hardman & Fehr,
His Attorneys.

Patented Dec. 11, 1945

2,390,892

UNITED STATES PATENT OFFICE 2,390,892

PIPE COUPLING

Alex A. McCormack, Dayton, Ohio, assignor to General Motors Corporation, Dayton, Ohio, a corporation of Delaware Application July 26, 1943, Serial No. 496,154

6 Claims. (Cl. 285—97.3)

This invention relates to a pipe coupling and more particularly a pipe coupling or swivel joint which permits relative rotation of the pipes joined thereby.

One object of this invention is to provide a gas-tight joint which does not materially interfere with free relative rotation of the pipe sections.

Another object of this invention is to provide a small light weight swivel joint for a fluid conduit.

A still further object of this invention is to simplify the manufacture of a swivel joint.

Further objects and advantages of the present invention will be apparent from the following description, reference being had to the accompanying drawing, wherein a preferred form of the present invention is clearly shown.

In the drawing:

Fig. 1 is a sectional view showing the construction of the swivel joint;

Fig. 2 is a sectional view of a blank used in making the main diaphragm assembly;

Fig. 3 is similar to Fig. 2 showing the resilient material vulcanized in place; and Fig. 4 is a view partly in elevation and partly in section showing the construction of the rotatable element prior to the cutting of the threads.

One of the major problems in the design of a gas-tight seal is that of obtaining proper alignment of the parts. Improper alignment of the parts not only interferes with obtaining a tight joint when the apparatus is new but also results in uneven wear of the seal surfaces which very quickly renders the seal useless. In designing the seal, it is necessary, therefore, to so construct and arrange the parts that the seal surfaces line up properly.

Referring now to the drawing in which I have shown a swivel joint incorporating my invention, reference numeral 10 designates a main casing which is provided with a threaded portion 12 for connecting the swivel joint into a fluid line. Reference numeral 14 designates a coupling element which is rotatable relative to the main casing 10. The element 14 is adapted to be connected to the other side of the fluid line in any convenient manner. As shown, an elbow 16 is threaded onto the element 14. The element 14 is provided with a central bore 26 which extends the full length thereof and a seal ring recess 18 in which there is mounted a rubber or rubber-like insert 20 which is adapted to resiliently support a seal ring 22 having a seal surface 24 arranged perpendicular to the walls of the bore 26. The outer bearing surfaces 28 and 30 of the element 14 are concentric with the bore 26 and perpendicular to the seal surface 24. The central portion 32 of the outer periphery of member 14 is cut away so as to reduce the friction losses. The bearing surfaces 28 and 30 are preferably chromium plated so as to provide hard bearing surfaces. The member 14 is journaled in the sleeve element 34 and the washer 36. In the lower portion of the casing 10 there is mounted a washer-like element 38 which has vulcanized thereto a rubber or rubber-like diaphragm 40 which has its inner edge vulcanized to the member 42. The member 42 is provided with a central seal ring recess 44 in which a rubber or rubber-like insert 48 is supported. The insert 48, in turn, supports the seal ring 50. By virtue of this construction, it is apparent that the seal rings 50 and 22 are both resiliently supported so as to allow a certain amount of adjustment.

A sleeve 52 is provided within the casing 10 and serves to clamp the washer-like element 38 in place against the bottom wall 54 of the casing 10. The sleeve 52 has an internal shoulder 53 which prevents too much downward movement of the member 14. A gasket 56 is provided between the washer-like element 38 and the bottom wall 54 of the casing 10 as shown. The upper end of the casing 10 is spun over as shown at 58 so as to hold the elements 36, 34, 52 and 38 in fixed relationship to one another within the casing 10. The sleeve 52 is provided with a pin 60 which cooperates with the slot 62 in the member 42 so as to prevent rotation of the member 42. Ball bearings 64 are provided as shown so as to facilitate rotation of the member 14 relative to the sleeve 34. A pair of bowed spring washers 66 are provided in the bottom of the casing 10 for biasing the seal rings 50 and 22 into engagement with one another. As shown in Fig. 1 the spring washers press against the bottom wall of the casing 10 and against the bottom surface of the element 42. By virtue of the above described arrangement, the fluid is free to flow through the central passage provided by the various elements described hereinabove, and the element 14 is free to rotate relative to the casing 10 and the parts carried thereby. The parts 52, 34, and 36 are held in place within the casing 10 by the flange 58 whereby these elements remain stationary relative to the casing 10 at all times.

In order to obtain accurately machined surfaces which are properly aligned, I have found the following procedure very helpful. A blank constructed as shown in Fig. 2 is first made up with a circular groove 68 in its one face which is later filled with a rubber or rubber-like gasket material 40 as shown in Fig. 3. In order to facilitate the filling of the circular groove 68, one or more holes 70 are drilled so as to provide openings through which the air in the bottom of the groove can escape as the groove is filled with the gasket material. After filling the groove with the gasket material which is preferably vulcanized to the side walls of the groove 68, the mounting surfaces and the seal ring supporting surfaces are machined so as to produce an element constructed as shown in Fig. 3. After the mounting surfaces and the main seal ring mounting surfaces have been properly machined and finished, the metallic connection between the seal ring supporting element 42 and the washer-like element 38 is severed by making a radial cut as shown at 72 in Fig. 1. By virtue of this procedure the critical surfaces of the seal ring supporting material 48 and the washer-like element 38 may be machined after the vulcanizing operation and prior to the time that the washer-like element 38 is severed from the member 22.

By virtue of the above described construction the seal surfaces are parallel to one another and the seal rings are very accurately aligned for rotation about the same central axis. The diaphragm 40 allows the necessary amount of axial movement of the seal rings for proper operation and the pin 60 prevents undue torsional strain on the diaphragm. Furthermore, the diaphragm is a substantially balanced diaphragm whereby high pressure fluid flowing through the central bore of the assembly will not unseat the seal even though the pressure on the outside is relatively very low. Thus, the device may be used in systems either of the high pressure type or of the low pressure type.

The composition of the elements 20, 40, 48 and 56 will, of course, be determined by the fluids flowing through the apparatus and the temperatures involved. For many purposes rubber would be very satisfactory, while for other purposes some form of synthetic rubber would be more satisfactory. The expression "rubber-like" is used herein to include various types of synthetic rubbers as well as natural rubber and any rubber substitute which has characteristics suitable for use in a device of this kind.

While the form of embodiment of the invention as herein disclosed constitutes a preferred form, it is to be understood that other forms might be adopted, as may come within the scope of the claims which follow.

What is claimed is as follows:

1. In combination, a substantially cup shaped casing, a spring washer adjacent the bottom wall thereof, a diaphragm assembly having a substantially central aperture and having its inner portion in engagement with said spring washer and its outer portion in sealing engagement with the bottom wall of said casing, a seal ring supported from the inner portion of said diaphragm assembly, a rotatable conduit having a seal surface in sealing engagement with said seal ring and having an opening in alignment with said aperture, and bearing means within said casing for said conduit.

2. In combination, a substantially cup shaped casing, a spring washer adjacent the bottom wall thereof, a diaphragm assembly having a substantally central aperture and having its inner portion in engagement with said spring washer and its outer portion in sealing engagement with the bottom wall of said casing, a seal ring supported from the inner portion of said diaphragm assembly, a rotatable conduit having a seal surface in sealing engagement with said seal ring and having an opening in alignment with said aperture, and bearing means within said casing for said conduit, the upper edge of said housing having an inturned flange for holding the parts in assembled relationship.

3. In combination, a substantially cup shaped casing, a spring washer adjacent the bottom wall thereof, a diaphragm assembly having a substantially central aperture and having its inner portion in engagement with said spring washer and its outer portion in sealing engagement with the bottom wall of said casing, a seal ring supported from the inner portion of said diaphragm assembly, a rotatable conduit having a seal surface in sealing engagement with said seal ring and having an opening in alignment with said aperture, bearing means within said casing for said conduit, the upper edge of said housing having an inturned flange for holding the parts in assembled relationship, and means preventing relative rotation between said casing and said seal ring.

4. Seal means comprising in combination an element having a flat seal surface, seal ring means rotatable relative to said element and having a flat seal surface in sealing engagement with said first named seal surface, and mounting means for said seal ring means comprising a support, a flexible diaphragm having its outer edge vulcanized to said support and having its inner edge vulcanized to said seal ring means, and means limiting relative rotation between said support and said seal ring means so as to substantially prevent torsional strain on said diaphragm.

5. In a pipe coupling for use in a fluid line, the combination, a first coupling element adapted to be connected to one side of the fluid line, a second coupling element adapted to be connected to the other side of the fluid line, means carried by one of said coupling elements for holding said coupling elements together, a diaphragm mounting element carried by said first coupling element, a seal ring supporting element, a rubber-like diaphragm element having its inner and outer edges vulcanized to said seal ring supporting element and said diaphragm mounting element respectively, a seal ring carried by said seal ring supporting element, a second seal ring supported by said second named coupling element and arranged in sealing engagement with said first named seal ring, and bearing means for supporting said second named coupling element for rotation relative to said first named coupling element.

6. In combination, a fluid casing, a diaphragm supporting element carried by said casing, a seal ring supporting element within said casing, a rubber-like diaphragm vulcanized to said seal ring supporting element and said diaphragm supporting element, a seal ring carried by said seal ring supporting element, conduit means extending from said casing and having a fluid passage communicating with fluid in said casing, means for rotatably supporting said conduit means relative to said casing, said conduit means including a seal ring cooperating with said first named seal ring to form a fluid tight joint between said conduit means and said casing.

ALEX A. McCORMACK.